June 27, 1950  A. C. COUTANT ET AL  2,513,149
ROTARY REFLECTING ELEMENT IN A VIEW FINDER FOR
CINEMATOGRAPHIC CAMERAS
Filed May 14, 1947
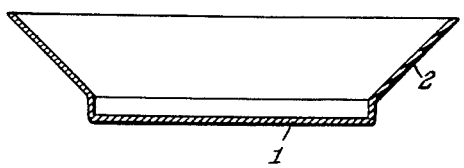
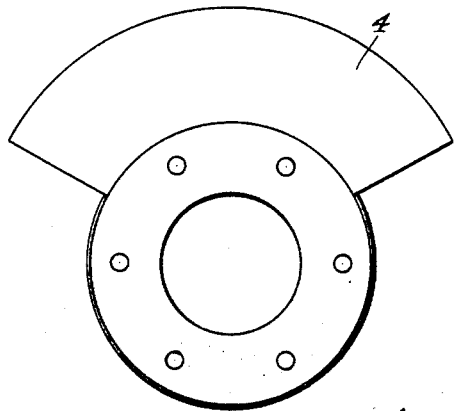
INVENTOR.
ANDRE CLEMENT COUTANT
AND JACQUES MATHOT
BY
ATTORNEY.

Patented June 27, 1950

2,513,149

UNITED STATES PATENT OFFICE 2,513,149

ROTARY REFLECTING ELEMENT IN A VIEW FINDER FOR CINEMATOGRAPHIC CAMERAS

André Clément Coutant and Jacques Mathot, Paris, France

Application May 14, 1947, Serial No. 747,906
In France May 27, 1946

2 Claims. (Cl. 88—73)

1

View-finders are used in cinematographic cameras in which the image is reflected by a sector rotated in synchronism with the shutter.

Usually, the reflecting sector consists of a plate of silvered glass or of polished stainless metal secured to a support attached to the shaft of the rotary shutter.

The parts thus designed are heavy, whereby on account of the high rotational speed vibrations are set up wherever the part is ever so little warped; moreover, the use of several materials with unequal coefficients of expansion gives rise to distortion and even to breakages in the case of temperature changes.

The present invention has for its object a reflecting element constituted by a reflecting sector made of a light metal such as aluminium, treated especially to give it the desirable stiffness and brightness and solid with a securing cup made of the same metal.

According to another characteristic of the invention said reflecting element may be obtained by a stamping step followed by a planishing step so that all the fibres of the metal shall undergo a hardening sufficient to increase their mechanical resistance.

These operations may be followed with a low-temperature annealing in order to stabilize the metal.

Thereafter the reflecting sector is machined with the aid of a diamond to constitute a perfectly plane reflecting surface; it is then proceeded to the electrolytic polishing step by which the metal is given reflecting properties almost equivalent to those of silvered glass and then to an oxidization by which a protective layer of alumina of a few microns is formed at its surface.

A reflector is thus obtained which is very light, perfectly machined to the exact dimensions required, having excellent optical properties, unaffected by temperature variations, that can be secured readily on its support by means of a few screws and replaced very rapidly and without any difficulty by a new one when damaged.

The manufacturing steps are described with reference to the appended drawing in which:

Figure 1 is a sectional view of the plate after the stamping step.

Figure 2 is a sectional view of the plate after the planishing step.

Figure 3 is a plan view of the final part.

The stamping of a circular disc of aluminum produces the cup 1 which extends in a frustum of a cone 2; the conical portion 2 thereafter is planished on the lathe so as to form the plane circular annulus 3 in which the sector 4 is cut out.

The reflecting side of the sector is dressed with a diamond, then subjected to an electrolytic pol-

2 ishing step and to an oxidization that forms a layer of a few microns.

Although in all the above only cinematographic cameras have been contemplated, it is quite evident that the reflecting element according to the invention may also be used in a photographic camera without thereby departing from the scope of the present invention.

What we claim as our invention and desire to secure by Letters Patent is:

1. A removable high speed rotary reflecting element in a view finder for cinematographic cameras consisting of an integral sheet aluminum stamping comprising a circular disc portion having a central aperture and a plurality of smaller spaced apertures around the central aperture, an integral annular flange portion surrounding said disc portion and an integral sector portion projecting radially from said flange portion in a plane parallel to but offset from the plane of said disc portion, the radius of said sector portion being approximately twice that of said disc portion, said sector portion being mechanically cold hardened and electrolytically polished, the polished surface being coated with a layer of alumina having a thickness of a few microns.

2. A removable high speed rotary reflecting element in a view finder for cinematographic cameras consisting of an integral sheet aluminum stamping of uniform thickness comprising a circular disc portion having a central aperture, an integral annular flange portion surrounding said disc portion and projecting approximately at right angles to the plane of the disc portion and an integral sector portion projecting radially from the outer edge of said flange portion in a plane parallel to but offset from the plane of said disc portion, the radius of said sector portion being approximately twice that of said disc portion, said sector portion being mechanically cold hardened and electrolytically polished, the polished surface being coated with a layer of alumina having a thickness of a few microns.

ANDRÉ CLÉMENT COUTANT.
JACQUES MATHOT.

REFERENCES CITED

The following references are of record in the file of this patent:

UNITED STATES PATENTS

| Number | Name | Date |
|---|---|---|
| 1,275,249 | Hlavaty | Aug. 13, 1918 |
| 1,353,191 | Thomas | Sept. 21, 1920 |
| 1,813,102 | Vogel | July 7, 1931 |
| 2,012,352 | Rusting et al. | Aug. 27, 1935 |
| 2,192,756 | Reardon | Mar. 5, 1940 |
| 2,340,461 | Gage et al. | Feb. 1, 1944 |